United States Patent [19]
Kato et al.

[11] Patent Number: 5,754,282
[45] Date of Patent: May 19, 1998

[54] OPTICAL DEVICE DETECTING DISPLACEMENT INFORMATION USING A DEVICE FOR FREQUENCY-SHIFTING AN INCIDENT BEAM AND A SYSTEM FOR REDUCING BEAM DIAMETER IN AN APPLICATION DIRECTION

[75] Inventors: Shigeki Kato, Utsunomiya; Makoto Takamiya, Tokyo, both of Japan

[73] Assignee: Canon Kabushiki Kaisha, Tokyo, Japan

[21] Appl. No.: 614,172

[22] Filed: Mar. 8, 1996

[30] Foreign Application Priority Data

Mar. 9, 1995 [JP] Japan .................. 7-078090

[51] Int. Cl.⁶ .................................................. G01B 9/02
[52] U.S. Cl. ........................ 356/28.5; 356/356; 359/278
[58] Field of Search ........................ 356/4.09, 410, 356/28.5, 356, 349; 359/278

[56] References Cited

U.S. PATENT DOCUMENTS

| 4,531,195 | 7/1985 | Lee | 364/822 |
|---|---|---|---|
| 5,327,222 | 7/1994 | Takamiya et al. | 356/356 |
| 5,483,332 | 1/1996 | Takamiya et al. | 356/28.5 |
| 5,502,466 | 3/1996 | Kato et al. | 356/356 |

OTHER PUBLICATIONS

R. Foord et al., "A solid-state electro-optic phase modulator for laser Doppler anemometry," J. Phys. D: Appl. Phys., vol. 7, L36–L39 (1974).

*Primary Examiner*—Samuel A. Turner
*Attorney, Agent, or Firm*—Fitzpatrick, Cella, Harper & Scinto

[57] ABSTRACT

An optical device, and an apparatus for detecting displacement information of an object using the optical device, include an electrooptical device for shifting a frequency of an incident beam by applying a voltage thereto and an optical system for converging the beam at least in a plane including an application direction of the voltage and traveling direction of the beam, and for decreasing a degree of change of the diameter of the converged beam at least in the plane so as to reduce the diameter of the beam incident on the electrooptical device at least in the application direction.

21 Claims, 10 Drawing Sheets

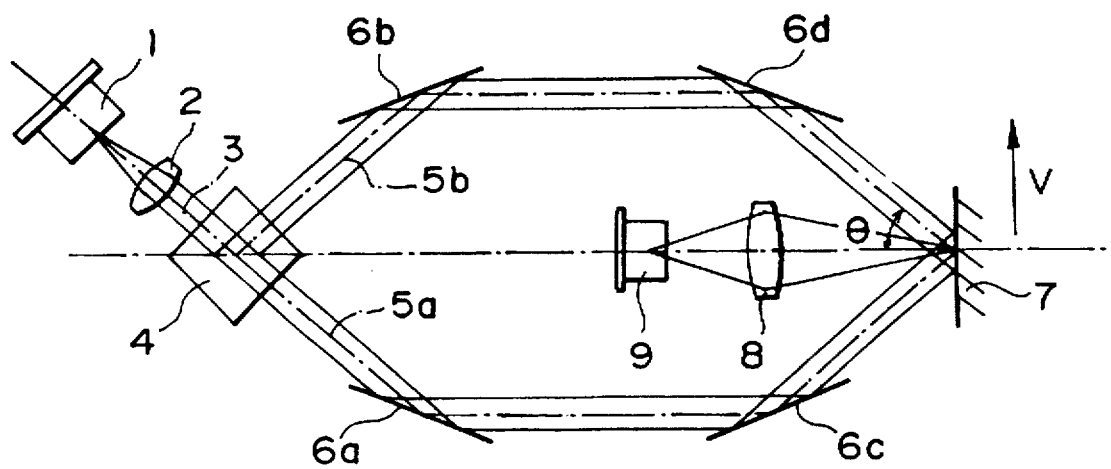
FIG. IA
PRIOR ART
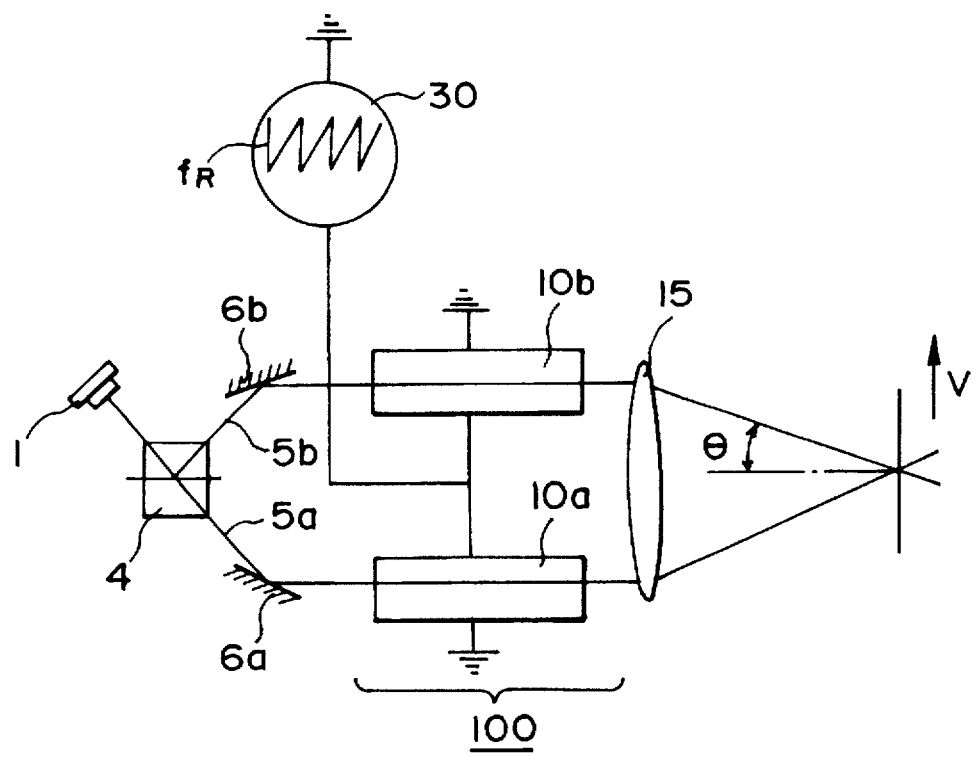
FIG. IB
PRIOR ART

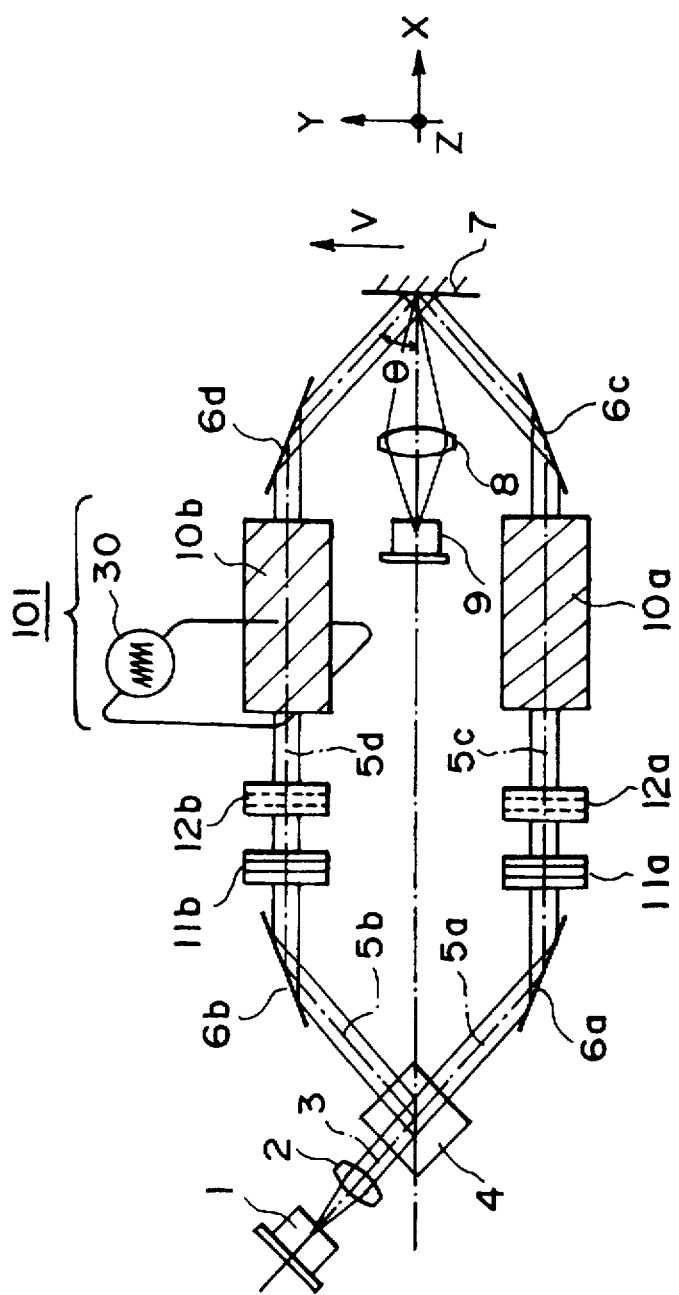
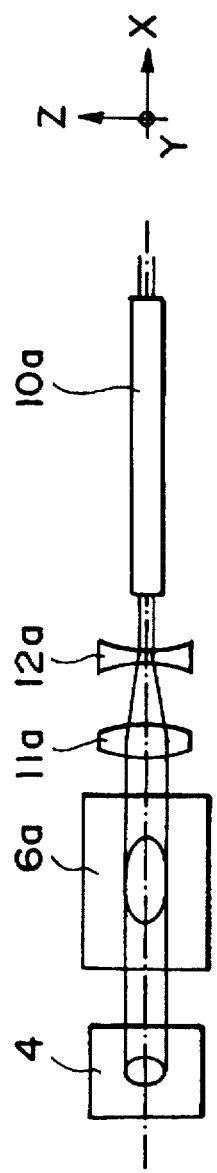
FIG. 2A
FIG. 2B

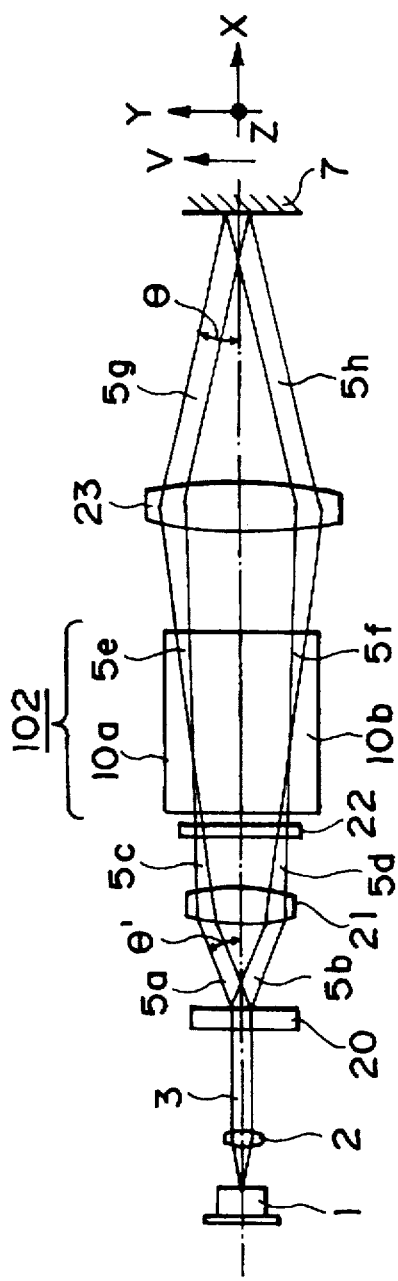
F I G. 4A
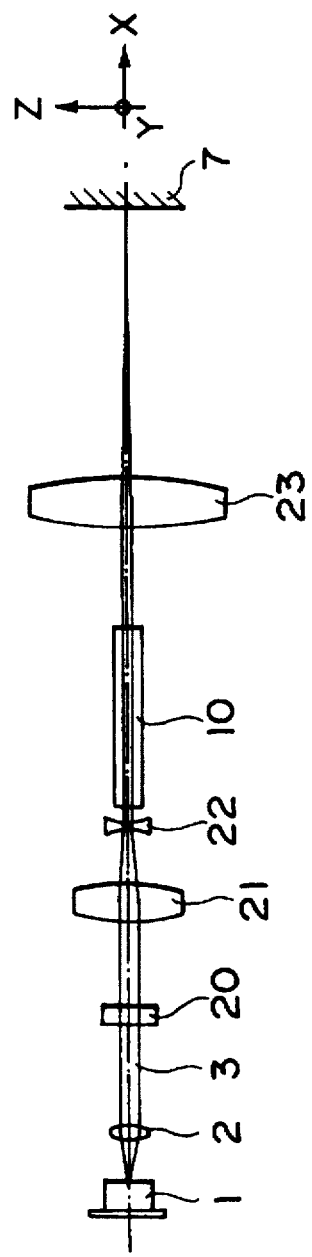
F I G. 4B

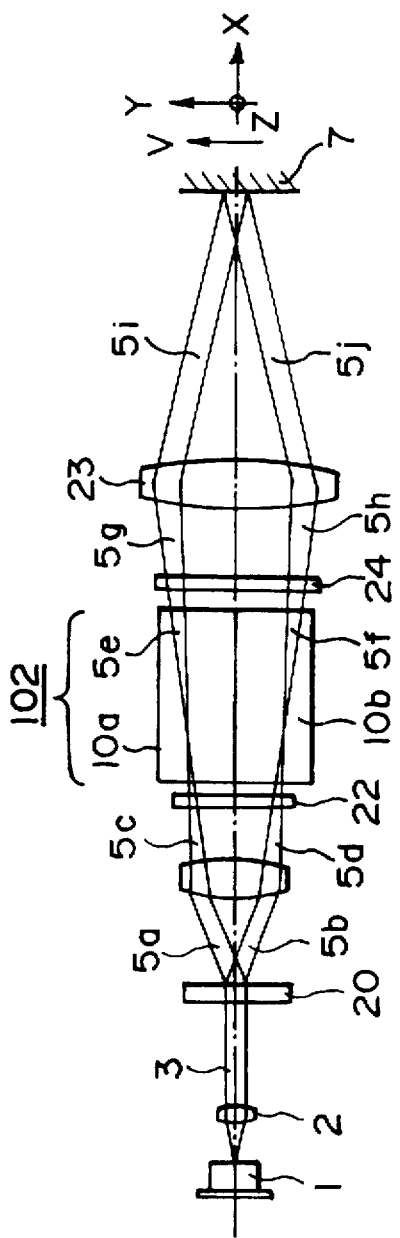
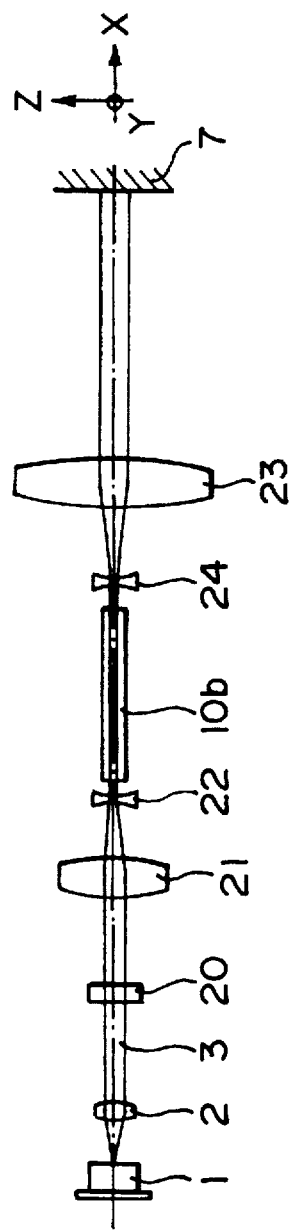
F I G. 6A
F I G. 6B

OPTICAL DEVICE DETECTING DISPLACEMENT INFORMATION USING A DEVICE FOR FREQUENCY-SHIFTING AN INCIDENT BEAM AND A SYSTEM FOR REDUCING BEAM DIAMETER IN AN APPLICATION DIRECTION

BACKGROUND OF THE INVENTION

1. Field of the Invention

The present invention relates to a displacement information detecting apparatus and an optical device that can be appropriately used therein, and is suitable to highly accurately measure displacement information, such as velocity and distance, of an object or fluid (hereinafter referred to as a "moving object") without physically contacting the moving object.

2. Description of the Related Art

Both a laser Doppler velocimeter (LDV) and a laser encoder (displacement measurement optical device) have been used for very accurately measuring the displacement information of a moving object without physically contacting the members. The laser Doppler velocimeter irradiates a moving object with a laser beam, and measures the velocity of the moving object by utilizing the effect (the Doppler effect) in which the frequency of the scattered light due to the moving object is shifted in proportion to the velocity of the moving object.

FIG. 1A is a schematic diagram illustrating the essential portions of a conventional laser Doppler velocimeter. Reference number 1 denotes a laser diode; 2, a collimating lens; 4, a beam splitter; 6a, 6b, 6c and 6d, mirrors; 7, an object to be measured (a moving object) that is traveling at a velocity V in the direction indicated by the arrow; 8, a condenser lens; and 9, a photodetector.

The operation of the prior art will now be explained. When a laser beam emitted from the laser diode 1 passes through the collimating lens 2, a collimated beam 3 is produced. The collimated beam 3 is then split by the beam splitter 4 to obtain two beams 5a and 5b. The fluxes 5a and 5b are respectively reflected by the mirrors 6a and 6c, and 6b and 6d. Thereafter, the moving object 7 is irradiated by the two fluxes 5a and 5b at an incident angle θ.

The light is scattered at the portion of the moving object 7 irradiated by the two beams 5a and 5b, and the scattered light is detected by the photodetector 9 through the condenser 8.

The frequencies of the scattered lights due to the two fluxes are respectively subject to Doppler shifts of +Δf and −Δf in proportion to the velocity V. When the wavelength of a laser beam is λ, the Doppler shift Δf is represented by the following expression:

$$\Delta f = V \cdot \sin(\theta)/\lambda \quad (1)$$

The scattered lights that are subject to Doppler shifts of +Δf and −Δf, interfere with each other to provide a change in brightness at the light receiving face of the photodetector 9. Frequency F of the brightness can be given by the following expression:

$$F = 2 \cdot \Delta f = 2 \cdot V \cdot \sin(\theta)/\lambda \quad (2)$$

Therefore, when the frequency F (hereinafter referred to as a "Doppler frequency") of a signal detected by the photo-detector 9 is measured, the velocity V of the moving object 7 can be obtained by using expression (2). This is the operation that is performed by the conventional laser Doppler velocimeter.

Generally, when an object is irradiated by light having high coherence, such as a laser beam, the scattered light is phase-modulated at random due to fine irregularity on a surface of the object, so that a spot marking, or a so-called speckle pattern, is formed on the face of the moving object that is observed.

In the laser Doppler velocimeter, when the moving object is travelled, the change in brightness at the detection face of the photodetector 9, which is caused by the Doppler shift, is modulated by irregular change in brightness caused by the flow of the speckle pattern.

The scattered light incident on the photodetector 9 is also modulated by change in transmittance (or in reflectivity) at the moving object 7.

In the conventional laser Doppler velocimeter, the frequencies of the change in brightness due to the flow of the speckle pattern, and the frequencies of the change in transmittance (or reflectivity) of the moving object 7 are lower than the Doppler frequency F that is given by the expression (2). Therefore, a method for electrically removing the low frequency components by passing the output of the photodetector 9 through a high-pass filter to extract only a Doppler signal F, is often employed.

When the velocity V of the moving object 7 is low, and hence the Doppler frequency F is low, however, the difference in frequency from a low frequency fluctuation component becomes small, so that there will arise a problem that a high-pass filter cannot be used and the velocity V of the moving object 7 can not be measured. Also, in principle, the conventional laser Doppler velocimeter can not detect the direction of the velocity.

According to one method proposed by Foord et al. (Appl. Phys., Vol. 7, 1974, L36–L39) in a laser Doppler velocimeter, a frequency shifter using a flat plate of electrooptic crystal (hereinafter referred to as an "electrooptical device"), is provided on two beam paths to give a frequency difference between the two beams, thereby accurately detecting the direction in which moving object is moving and a velocity, even one that is close to 0.

FIG. 1B is a schematic diagram illustrating the essential portion of a laser Doppler velocimeter that employs the above described principle. A frequency shifter 100 is constituted by electrooptical devices 10a and 10b, a drive circuit 30 thereof, and the like.

The operation performed by the laser Doppler velocimeter will now be explained. Collimated light emitted from a light source 1 is separated into two beams 5a and 5b by a beam splitter 4, and the fluxes are passed through the electrooptical devices 10a and 10b via mirrors 6a and 6b, respectively. At this time, the electrooptical device 10a is driven by the drive circuit 30 at a voltage having a sawtooth waveform (by serrodyne driving), whose amplitude corresponds to an optical phase of 2π, and provides a frequency shift for the beam 5a. Similarly, a frequency shift is provided for the beam 5b by driving the electrooptical device 10b at a voltage having a sawtooth waveform. The two beams subject to frequency shift are polarized by a lens 15, and the two polarized fluxes together irradiate the moving object 7 at an incident angle θ. The scattered light on the portion of the moving object 7 irradiated by the two fluxes is detected by a photodetector (not shown) after it passes through a collimating lens (not shown).

This structure is employed mainly for a current meter, to make it possible to measure a stationary state of the moving object and a direction of the velocity.

In this case, by using frequency difference $f_R$, which is provided for two beams, Doppler frequency F is represented as follows:

$$F = \frac{2 \cdot V \cdot \sin(\theta)}{\lambda} + f_R \quad (3)$$

Therefore, even when the velocity V of the moving object is low, if a proper value is set for the frequency difference $f_R$, the difference in the frequency from a low frequency element, which is due to the flow of the speckle pattern and a change in transmittance (or reflectivity) of the moving object 7, can be adequately obtained. Thus, the low frequency component can be electrically removed to extract only a desired Doppler signal, thereby making it possible to measure the velocity of the moving object 7 from zero (0), and also the direction of the velocity.

An example wherein a frequency shifter is applied to a conventional laser Doppler velocimeter, has been explained. In an encoder, the displacement data for a scale (a diffraction grating), which is an object to be measured, is detected by using a beam having passed through a frequency shifter, and hence the resolution of the encoder can be increased. This can be effectively used for a value-added technique as well as for a laser Doppler velocimeter.

SUMMARY OF THE INVENTION

There is no limitation on an object that can be targeted by the laser Doppler velocimeter, however, if the diffuse reflectivity of an object is low, the amount of light entering the photodetector is reduced, and the level of an output signal is lowered. In order to provide a high accuracy in such a case, it is preferable that signal-to-noise ratio (S/N ratio) of a Doppler signal be increased.

To do this, it is effective that an amount of light emitted from a light source is more utilized, and the illuminance is increased at the time a moving object is irradiated. Specifically, it is effective to increase an NA of a collimating lens to take a large amount of light from the light source.

When an electrooptical device of the frequency shifter is driven, serrodyne driving must be performed by using a voltage that provides a phase difference of $2\pi$ for two beams. This voltage is proportional to the thickness of the electrooptical device. As the NA of the collimating lens is increased, the diameter of the two split collimated beams tends accordingly to be larger. In such a case, the electrooptical device is thick and a high voltage drive circuit is required.

If the electrooptical device for the conventional laser Doppler velocimeter is made thin to avoid the above described problem, a beam tends to be vignetted. Thus, the useable amount of light from the light source becomes small and the cross section of the beam must be reduced, so that a large amount of light can not be used and the detection output may be reduced.

In the laser Doppler velocimeter, the modulation of the many speckles occurring at the photodetector generates electric signals. This is the sum of the photoelectric signals for speckles having various phases and blinking. Therefore, if the size of the speckles occurring at the photodetector is made large and the number of the speckles is reduced, the averaging action for signals is lowered, a Doppler signal level goes high, and the S/N ratio of a signal is improved.

The diameter of the speckles occurring at the photodetector is related to a diameter of a beam irradiating the moving object. An explanation for this will now be given. FIG. 1C is a diagram for explaining the diameter of a laser beam and the diameter of a speckle pattern. The average diameter D of the speckles occurring at the photodetector is generally given by the following expression:

$$D = 1.22 \lambda \cdot L / \phi$$

wherein L denotes a distance from an object to be irradiated to the photodetector, and $\phi$ denotes the diameter of a laser beam irradiating the moving object.

As is apparent from the expression, the diameter of a beam is preferably small in order to increase the speckle diameter D and to raise the Doppler signal level.

From a view different from a speckle, the diameter of a beam must be large depending on an object to be measured. FIG. 1D is a diagram for explaining the relationship between the diameter of a laser beam and an allowable amount of positional deviation for a moving object. As is illustrated, as the diameter of a laser beam is increased, the allowable amount of positional deviation becomes greater. Therefore, it is more preferable that a laser beam having a large diameter is irradiated, thereby making the allowable amount of positional deviation great if a moving object wobbles a lot.

It is one object of the present invention to provide a displacement information detecting apparatus that can satisfy the above described requirements and an optical device capable of realizing the apparatus.

It is another object of the present invention to provide a displacement information detecting apparatus that can obtain more highly sensitive and highly accurate velocity information than a conventional one, while a thickness of an electrooptical device is thinner than a conventional one to simplify a drive circuit for the electrooptical device capable of realizing the apparatus.

The other objects of the present invention will become obvious during the course of the following explanation of the embodiments.

BRIEF DESCRIPTION OF THE DRAWINGS

FIG. 1A is a diagram illustrating a conventional laser Doppler velocimeter;

FIG. 1B is a diagram illustrating a conventional laser Doppler velocimeter that employs a frequency shifter;

FIG. 2A is a schematic plan view illustrating the essential portion for a first embodiment of the present invention;

FIG. 2B is a schematic partial side view illustrating the essential portion for the first embodiment of the present invention;

FIG. 4A is a schematic plan view illustrating the essential portion for a second embodiment of the present invention;

FIG. 4B is a schematic partial side view illustrating the essential portion for the second embodiment of the present invention;

FIG. 6A is a schematic plan view illustrating the essential portion for a third embodiment of the present invention;

FIG. 6B is a schematic partial side view illustrating the essential portion for the third embodiment of the present invention;

DETAILED DESCRIPTION OF THE PREFERRED EMBODIMENTS

Figure 1C:
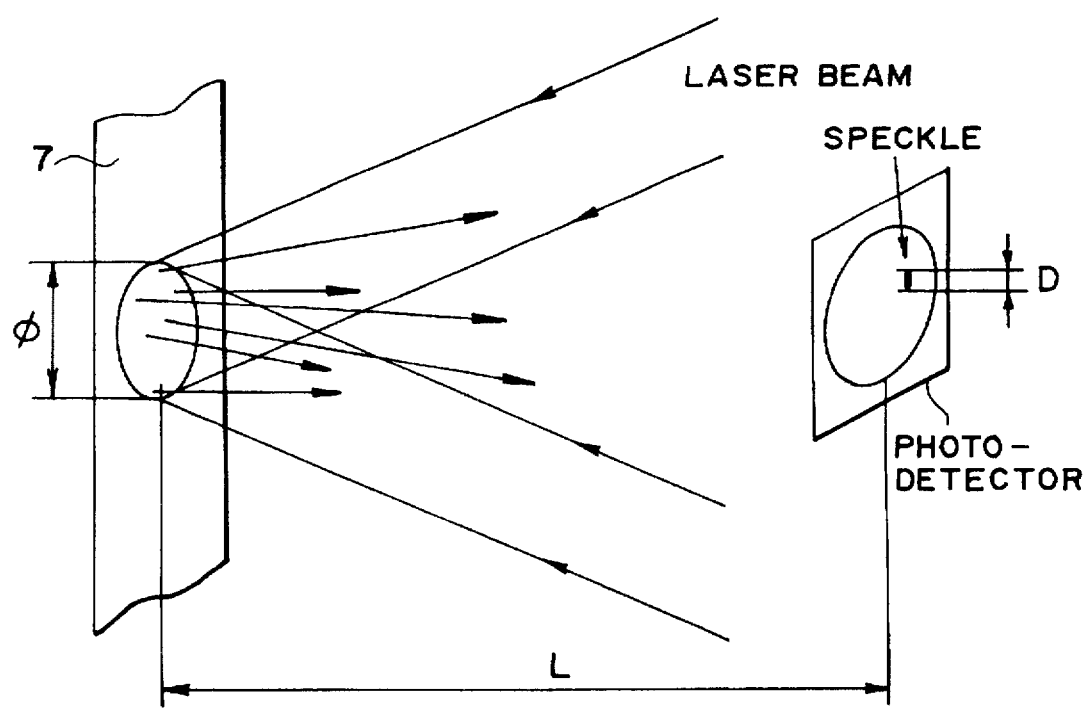
FIG. 1C is a diagram for explaining the diameter of an irradiation beam and the diameter of a speckle pattern.
Figure 1D:
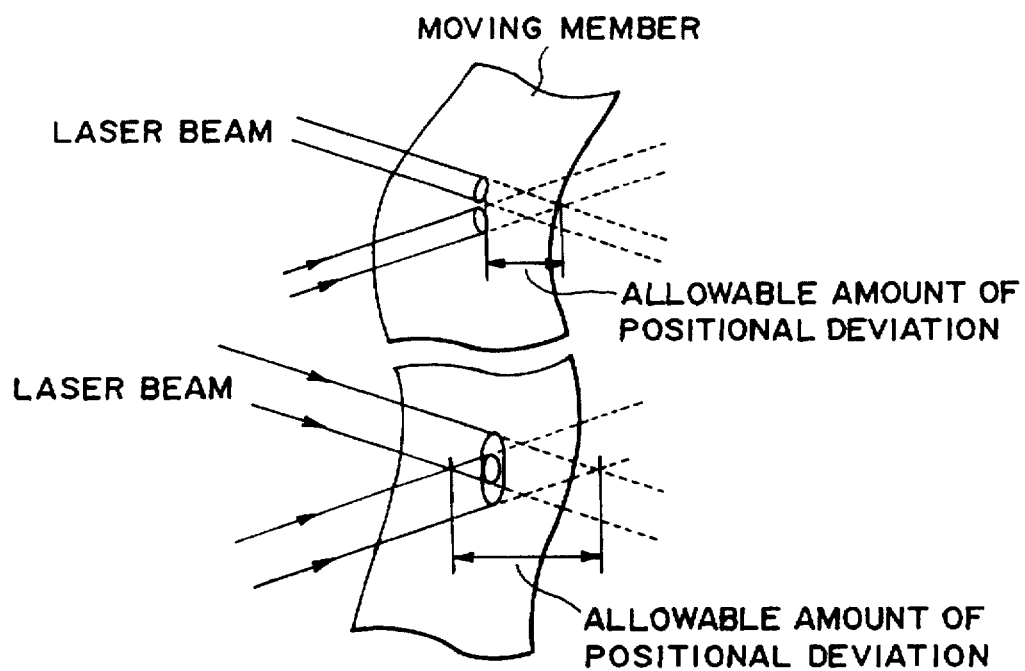
FIG. 1D is a diagram for explaining the relationship between the diameter of an irradiation beam and an allowable amount of positional deviation.

FIGS. 2A and 2B are schematic diagrams illustrating the essential portion for a first embodiment of the present invention. FIG. 2A is a plan view and FIG. 2B is a partial side view.

A light source (light supply means) 1 is composed of a laser diode. A collimating lens 2 converts a beam emitted by the light source 1 into a collimated flux 3. A beam splitter 4 (light separation means, light separation member) splits the collimated flux 3 into two collimated fluxes 5a and 5b. Reference numbers 6a to 6d denote mirrors; 11a and 11b, convex (positive) cylindrical lenses; and 12a and 12b, concave (negative) cylindrical lenses.

In this embodiment, a plane on which two primary light rays (center light rays of fluxes) of the two beams 5a and 5b are present is defined as an X-Y plane. A line on this plane, having substantially the same distance relative to the two primary rays is defined as an X axis. A direction on the X-Y plane that is orthogonal to the X axis is defined as a Y axis, and a direction perpendicular to the X-Y plane is defined as a Z axis to establish XYZ coordinates.

The generatrix of each of the cylindrical lenses in this embodiment is located on the X-Y plane and is parallel to the Y axis.

Rectangular electrooptical devices 10a and 10b each have a flat light incidence face and a flat light exit face, and have a cross section having a long side in the Y direction. The electrooptical devices 10a and 10b and a drive circuit 30 constitute a frequency shifter 101. A moving object (an object to be measured) 7 travels at velocity V in a direction indicated by an arrow. Reference number 8 denotes a condenser and reference number 9 denotes a photodetector (detection means).

The mirrors 6a to 6d, the convex cylindrical lenses 11a and 11b, the concave cylindrical lenses 12a and 12b and the electrooptical devices 10a and 10b or the like each constitute one element of optical means.

Figure 3A:
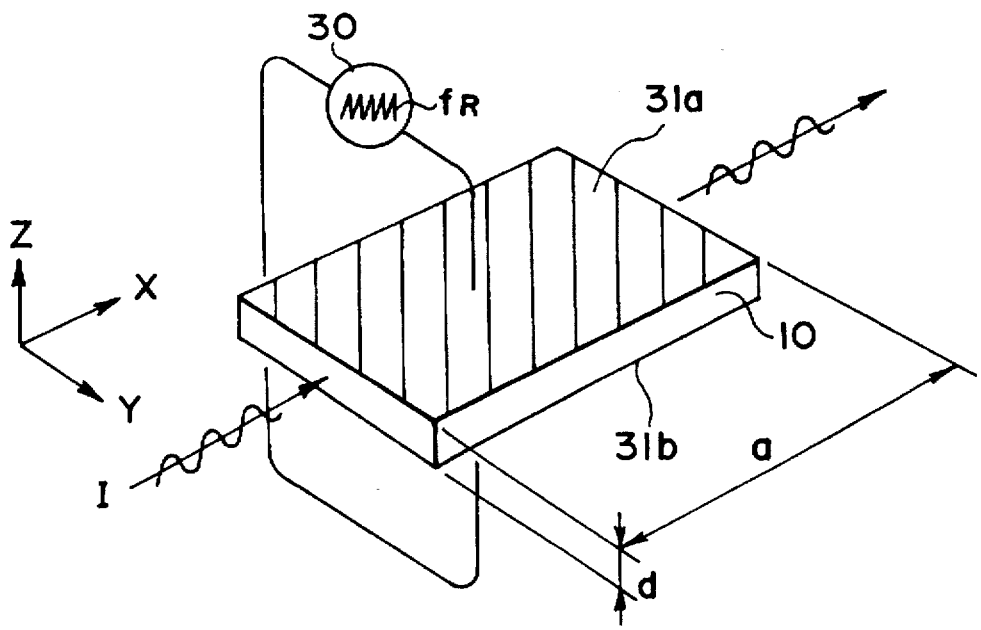
FIG. 3A is a diagram for explaining a frequency shifter by using an electrooptic crystal.

The structure and the function of the frequency shifter 101 in this embodiment will be explained. FIG. 3A is an explanatory diagram for the frequency shifter 101. An electrooptical device 10 is composed of a flat plate of electrooptic crystal $LiNbO_3$. Electrodes 31a and 31b are attached to the electrooptical device 10.

The electrooptic crystal is one that a refractive index of a medium is changed by the application of an electric field, and is, for example, $LiNbO_3$ or $LiTaO_3$ of a trigonal system $3m$, or $(NH_4)H_2PO_4(ADP)$ or $KH_2PO_4(KDP)$ of a tetragonal system $42m$. An explanation will be given in which $LiNbO_3$ is employed as an example.

The index ellipsoid of $LiNbO_3$ ($3m$) is represented as follows:

$$\left( \frac{1}{n_o^2} - \gamma_{22}E_2 + \gamma_{13}E_3 \right) X^2 + \qquad (4)$$

$$\left( \frac{1}{n_o^2} + \gamma_{22}E_2 + \gamma_{13}E_3 \right) Y^2 + \left( \frac{1}{n_e^2} + \gamma_{33}E_3 \right) Z^2 -$$

$$2\gamma_{22}E_1XY + 2\gamma_{51}E_2YZ + 2\gamma_{51}E_1ZX = 1$$

As is shown in FIG. 3A, when an electric field is applied to the Z axis ($E_3 \neq 0$, $E_1 = E_2 = 0$) and the X axis is selected to transfer light, the index ellipsoid in the X=0 cross section is represented as follows:

$$\left( \frac{1}{N_0^2} + \gamma_{13}E_3 \right) Y^2 + \left( \frac{1}{N_e^2} + \gamma_{33}E_3 \right) Z^2 = 1 \qquad (5)$$

wherein $\gamma$ denotes a Pockles constant, and $N_o$ and $N_e$ denote refractive indexes of an ordinary ray and an extraordinary ray, respectively.

Expression (5) is simplified as follows due to $n_e^3 \gamma_{33} E_3 \ll 1$:

$$\frac{Y^2}{N_0^2 \left(1 - \frac{1}{2} N_0^2 \gamma_{13}E_3\right)^2} + \frac{Z^2}{N_e^2 \left(1 - \frac{1}{2} N_e^2 \gamma_{33}E_3\right)^2} = 1 \qquad (6)$$

When the Z axis is selected as the direction in which beam I is polarized, refractive index $N(E_3)$, which is due to the electrical field, need only be watched for the Z axis, and is represented as follows:

$$N(E_3) = N_e \left( 1 - \frac{1}{2} N_e^2 \gamma_{33} E_3 \right) \qquad (7)$$

When the thickness of $LiNbO_3$ is defined as d, voltage $V=E_3d$. When the wavelength of beam I is defined as λ, optical phase difference τ(V), relative to difference in voltage after light has passed through the $LiNbO_3$ having a length a, is represented by the following expression:

$$\Gamma(V) = 2 \frac{\pi}{\lambda} \cdot \left( N \frac{V}{d} - N(0) \right) a = - \frac{\pi N_e^3 \gamma_{33} a}{\lambda d} V \qquad (8)$$

Therefore, if the change in the voltage V per unit of time is constant, a change current in the phase of the light having passed through $LiNbO_3$ is constant per unit of time. In other words, the frequency shifter is provided.

Figure 3B:
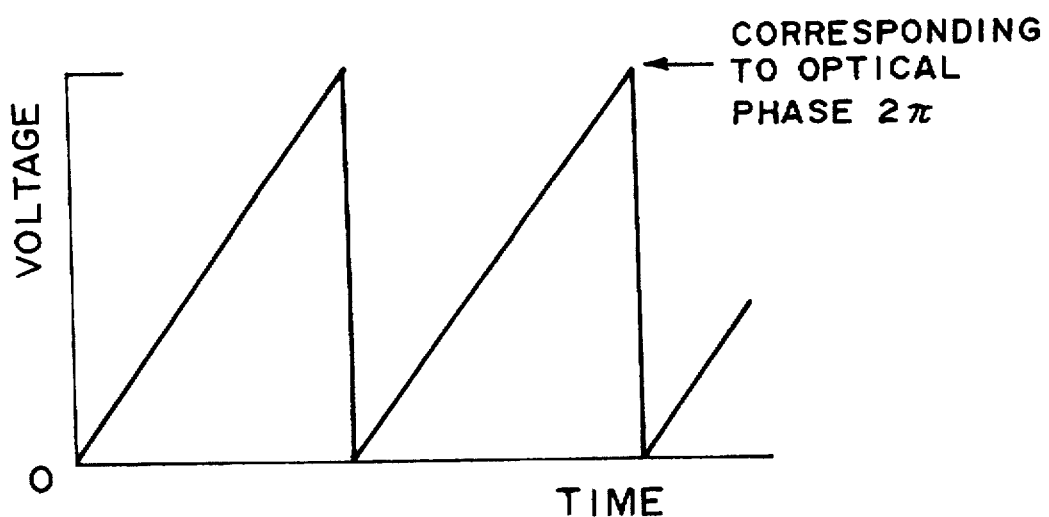
FIG. 3B is a diagram for explaining serrodyne driving.

Actually, since a voltage becomes infinite as it is consistently and constantly changed, sawtooth wave (serrodyne) driving is performed as shown in FIG. 3B. At this time, a single voltage amplitude value corresponds to optical phase $2\pi$ so that the optical phase is not discontinuous at the falling portion.

When, for example, wavelength λ of beam I=780 nm, and the thickness d of the $LiNbO_3$ electrooptical device=1 mm and its length a=20 mm, the voltage amplitude value corresponding to optical phase $2\pi$ is V =230 V. When the serrodyne frequency=$f_R$, beam I is frequency-shifted by $f_R$.

The function of the frequency shifter in this embodiment has been explained.

The function for this embodiment will now be described. In FIGS. 2A and 2B, a laser beam that is emitted by the laser diode 1 passes through the collimating lens 2 to obtain the collimated beam 3, which is thereafter split by the beam splitter 4 to provide the beams 5a and 5b.

The beam 5a (or 5b) is reflected by the mirror 6a (or 6b), thereafter, the beam having a polarization direction in the Z axial direction passes through the convex (positive) cylindrical lens 11a (11b) and the concave (negative) cylindrical lens 12a (12b). At this time, the beam is refracted only in the Z axial direction by the concave cylindrical lens 11a (11b) and the diameter in the Z axial direction is reduced. The beam is then is changed by the concave cylindrical lens 12a (12b) into beam 5c (5d) whose diameter is compressed in the Z axial direction and which is flat and substantially parallel. The beam 5c (5d) then enters the electrooptical device 10a (10b).

When the two beams 5c and 5d pass through the respective electrooptical devices 10a and 10b, only the beam 5d receives the frequency shift. The fluxes emitted from the electrooptical devices 10a and 10b are reflected by the mirrors 6c and 6d, respectively, thus two flux irradiation is performed on the moving object 7 at incident angle θ. A scattered light from the portion of the moving object 7 irradiated by the two fluxes is detected through the condenser 8 by the photodetector 9.

The convex cylindrical lens 11a (11b) constitutes one element of flux reduction means for reducing the diameter of the beam 5a (5b) in the Z axial direction to enter the electrooptical device 10a (10b).

The convex cylindrical lenses 11a and 11b and the concave cylindrical lenses 12a and 12b are optical members having a different refractivity in the direction in which the moving object travels (the Y axial direction), and in the perpendicular direction (the Z axial direction).

As is apparent from expression (8), if the thickness d of $LiNbO_3$ can be 1/n, phase difference τ(V) of light of the same quantity can be obtained even though the voltage V for serrodyne driving is 1/n. As a result, a required voltage applied to the electrooptical devices 10a and 10b can be low, and the driver circuit 30 can be simplified.

In this embodiment, the NA of the collimating lens 2 is increased and a solid angle at which a laser beam emitted by the laser diode 1 is taken in, is also increased, so that even when the diameters of the collimated flux 3 and the split fluxes 5a and 5b are made large, the beams are made thin in the Z axial direction by the beam reduction means when they enter the electrooptical devices 10a and 10b. Also, beams are formed substantially parallel within the X-Z plane by the concave cylindrical lenses 12a and 12b, and are incident on electrooptical devices 10a and 10b. Therefore, there is no light-vignette even in the thin electrooptic devices 10a and 10b, thus the same optical phase difference as is obtained by driving a conventional thick electrooptical device at a higher voltage, can be obtained by the application of a lower voltage. Thus, a laser Doppler velocimeter having high sensitivity and accuracy and high S/N ratio can be realized by a simple construction of the drive circuit.

FIGS. 4A and 4B are schematic diagrams illustrating the essential portion for a second embodiment of the present invention. FIG. 4A is a plan view and FIG. 4B is a partial side view. Reference number 1 denotes a light source (light supply means), which is a laser diode; and 2 denotes a collimating lens. Reference number 20 denotes a diffraction grating (light splitting means, light splitting member) wherein a grating pitch is p and a grating arrangement direction is along the Y axis. Reference number 21 denotes a first positive lens, (convex lens) of spherical face; and 22 denotes a first cylindrical lens having a negative refractivity.

In this embodiment, as well as the first embodiment, a plane on which two primary light rays of (center light rays of fluxes) two beams split by light splitting means, are present, is defined as an X-Y plane. A line on this plane, having the substantially same distance relative to the two primary rays is defined as an X axis, a direction on the X-Y plane that is orthogonal to the X axis is defined as a Y axis, and a direction perpendicular to the X-Y plane is defined as a Z axis, to establish XYZ coordinates.

The generatrix of the first cylindrical lens in this embodiment is located on the X-Y plane and is parallel to the Y axis.

Rectangular electrooptical devices 10a and 10b have a flat light incidence face and a flat light exit face, and have a cross section having a long siecle in the Y direction. The electrooptical devices 10a and 10b and a drive circuit (not shown) constitute a frequency shifter 102. A second positive (convex) lens 23 is spherical. A moving member 7 travels at velocity V in the direction indicated by an arrow. In this embodiment, a condenser and a photodetector (detection means) (neither of them shown) are provided in the same manner as in the first embodiment.

The first convergent lens 21, the first cylindrical lens 22, the electrooptical devices 10a and 10b, the second convergent lens 23 or the like each constitute one element of optical means.

The function in the second embodiment will now be explained. It is so constructed that a laser beam emitted by the laser diode 1 becomes a linearly polarized light in the Z axial direction. This beam is changed by the collimating lens 2 into a collimated beam 3. The collimated beam 3 is split by the diffraction grating 20 into two beams 5a and 5b at a diffraction angle θ'. Diffraction angle θ' has the following relationship:

$$p \cdot \sin θ' = \lambda$$

The beams 5a and 5b pass through the first positive lens 21 to be convergent beams 5c and 5d to enter the first cylindrical lens 22, in this part are changed to substantially collimated beams within the X-Y plane, while the beams 5e and 5f as they remain convergent in the X-Y plane, then enter the electrooptical devices 10a and 10b. The beams emitted from the electrooptical devices 10a and 10b, are refracted by the second positive lens 23, and are changed into beams 5g and 5h, which are parallel in the X-Y plane and are focused in the vicinity of the moving member 7 in the X-Z plane. Thus, the moving member 7 travelling at velocity V is irradiated by the two beams at an incident angle θ.

The first positive lens 21 constitutes one element of beam reduction means. The first cylindrical lens 22 is an optical member having different refractivities in the Y axial direction and in the Z axial direction.

Figure 5:
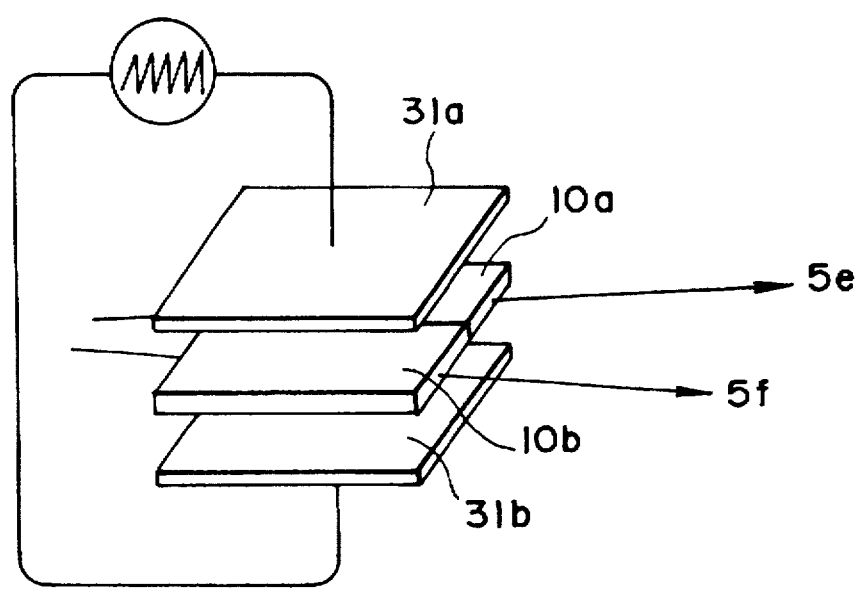
FIG. 5 is a diagram for explaining a frequency shifter.

FIG. 5 is an explanatory diagram for the frequency shifter 102 in this embodiment. Reference numbers 31a and 31b denote electrodes. The electrooptical devices 10a and 10b formed of $LiNbO_3$, are located with their crystal axes upside down.

With the structure in FIG. 5, suppose that length a of the electrooptical devices 10a and 10b=20 mm, in order to shift the phase of an laser beam of λ=685 nm by 2π, an applied voltage required is 240 V when the thickness d of the $LiNbO_3$ electrooptical devices 10a and 10b=2 mm. When the thickness d of the elecrooptical devices=1 mm, the applied voltage required is only 120 V.

In this embodiment, the NA of the collimating lens 2 is increased and a solid angle at which a laser beam emitted from the laser diode 1 is taken in, is also increased, so that even when the diameter of the collimated flux 3 is large, the beam is made thin and parallel in the Z axial direction when it enters the electrooptical device 10a or 10b. Therefore, there is no light-vignette even in the thin electrooptical devices 10a and 10b, thus the same optical phase difference as is obtained by driving a conventional thick electrooptical device at a higher voltage, can be obtained by the application of a low voltage.

The beams 5g and 5h emitted from the second positive lens 23, become collimated parallel light, which is then irradiated to the measurement portion with an ellipsoid of a great oblateness. Therefore, since the diameter of a light ray in the direction of the detected velocity (Y axial direction) is large and the irradiation diameter in the Z axial direction is small, the diameter of each speckle is increased in the Z axial direction at the detection face of the photodetector, and the number of speckles is decreased. In addition, the level of a Doppler signal goes high and S/N ratio of the signal is improved. Thus, a laser Doppler velocimeter having high sensitivity and accuracy and high S/N ratio can be realized by the simple construction of the drive circuit.

FIGS. 6A and 6B are schematic diagrams illustrating the essential portion for a third embodiment of the present invention. FIG. 6A is a plan view and FIG. 6B is a partial side view. The structure in this embodiment is substantially the same as that in the second embodiment, except that a second cylindrical lens 24 having negative refractivity is additionally provided behind the electrooptical devices 10a and 10b.

In this embodiment, as well as in the previous embodiments, a plane on which two primary light rays of two split beams obtained by the light splitting means (center light rays of fluxes) are present, is defined as an X-Y plane. A line on this plane, having substantially the same distance relative to the two primary rays, is defined as an X axis, a direction in the X-Y plane that is orthogonal to the X axis is defined as a Y axis, and a direction perpendicular to the X-Y plane is defined as a Z axis, to establish XYZ coordinates.

The generatrix of the second cylindrical lens 24 in this embodiment is located on the X-Y plane and is parallel to the Y axis.

In this embodiment, the first convergent lens 21, the first cylindrical lens 22, the electrooptical devices 10a and 10b, the second cylindrical lenses 24, the second convergent lens 23 or the like each constitute one element of optical means.

The function of the third embodiment will now be explained. The beams 5e and 5f emitted from the electrooptical devices 10a and 10b become by the second cylindrical lens 24 beams 5g and 5h that are divergent within the X-Z plane. Then, the beams 5g and 5h are refracted by the second positive lens 23 and are changed to beams 5i and 5j that are parallel in the X-Y plane and that have a predetermined spread in the X-Z plane. Both of the beams 5i and 5j are used to irradiate the moving object 7 at an incident angle θ. In this case, "predetermined spread" includes both "divergence" and "convergence".

The first positive lens 21 constitutes one element of beam reduction means component. The first cylindrical lens 22 and the second cylindrical lens 24 are optical members having a different refractivity in the Y axial direction and in the Z axial direction.

In this embodiment, the same effect can be obtained as in the first embodiment. In addition, since the diameter of an irradiation beam is made large, an object that wobbles or a fine object such as a thread, can be easily introduced into an area in which measurement can be conducted.

Figure 7A:
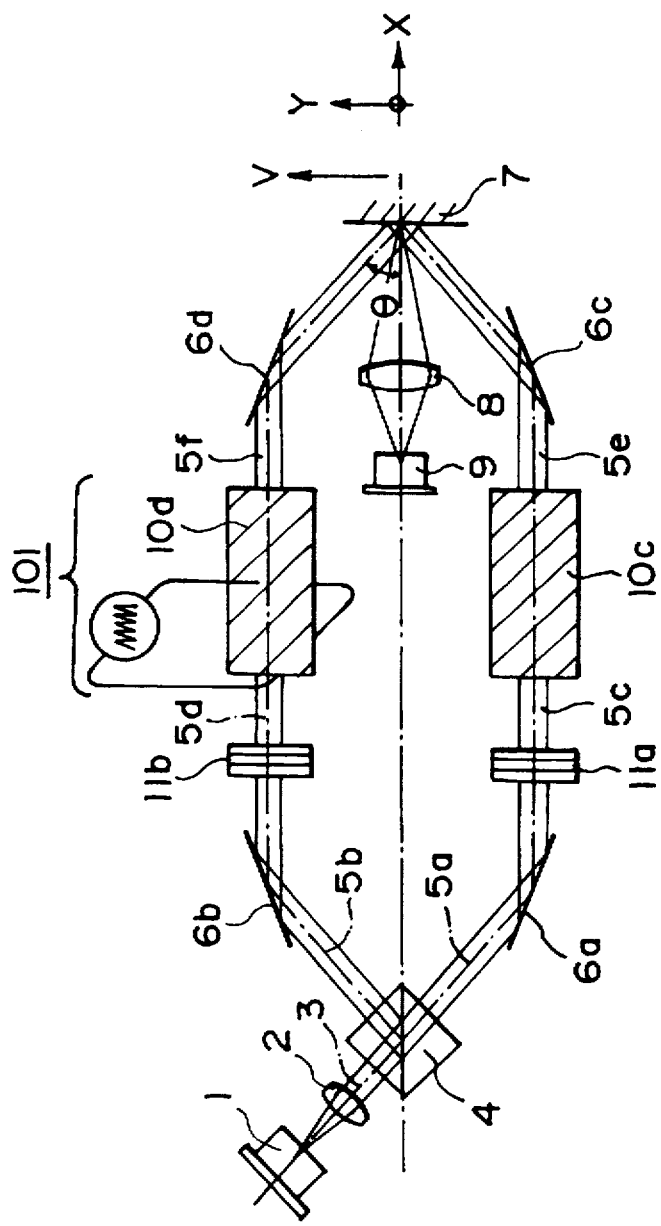
FIG. 7A is a schematic plan view illustrating the essential portion for a fourth embodiment of the present invention.
Figure 7B:
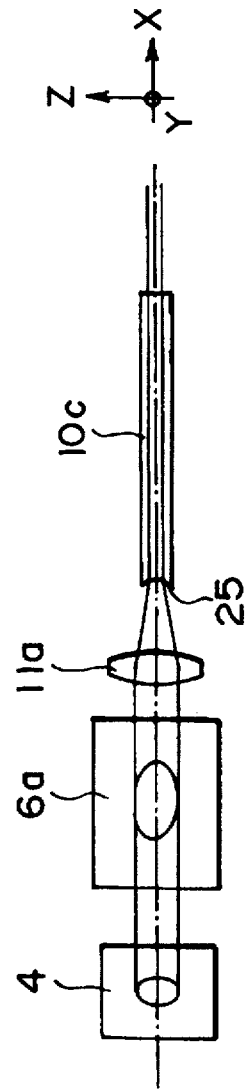
FIG. 7B is a schematic partial side view illustrating the essential portion for the fourth embodiment of the present invention.

FIGS. 7A and 7B are schematic diagrams illustrating the essential portion for a fourth embodiment of the present invention. FIG. 7A is a plan view and FIG. 7B is a partial side view. The structure in this embodiment is substantially the same as that in the first embodiment, except that instead of concave cylindrical lenses 12a and 12b, the beam incidence faces of the electrooptical devices 10c and 10d are made concave cylindrical faces 25. In addition, the XYZ axial directions are set in the same manner. The generatrix of each of the concave cylindrical faces 25 is located on the X-Y plane and is parallel to the Y axis.

In this embodiment, the mirrors 6a to 6d, the convex cylindrical lenses 11a and 11b, the electrooptical devices 10c and 10d or the like each constitute one element of optical means.

The function of the fourth embodiment will now be explained. The two beams 5a and 5b are reflected by the mirrors 6a and 6b, and become, through convex (positive) cylindrical lenses 11a and 11b beams 5c and 5d that are convergent in the Z axial direction. Then, the beams 5c and 5d enter the electrooptical devices 10c and 10d. The two beams 5c and 5d pass through the respective concave cylindrical faces 25, then are changed to beams 5e and 5f, which are substantially parallel in the Z axial direction. The beams 5e and 5f pass through the electrooptical devices 10c and 10d. The function thereafter is the same as that in the first embodiment.

In this embodiment, the first convex cylindrical lenses 11a and 11b constitute one element of beam reduction means, and are optical members having a different refractivity in the Y axial direction and in the Z axial direction.

With this embodiment, the same effect can be obtained as with the first embodiment, and since a number of optical devices is reduced as compared with the first embodiment, manufacturing costs and a loss of light quantity due to the reflection plane can be reduced.

Figure 8A:
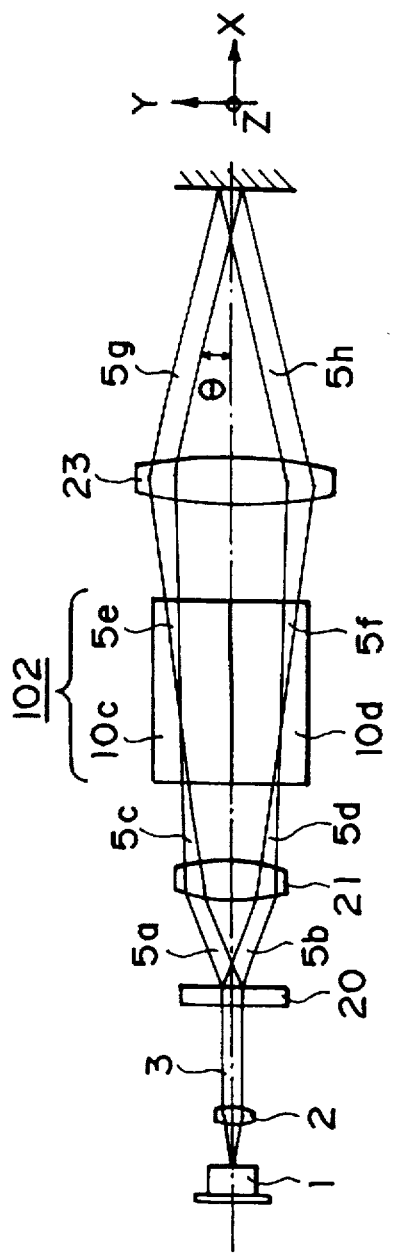
FIG. 8A is a schematic plan view illustrating the essential portion for a fifth embodiment of the present invention.
Figure 8B:
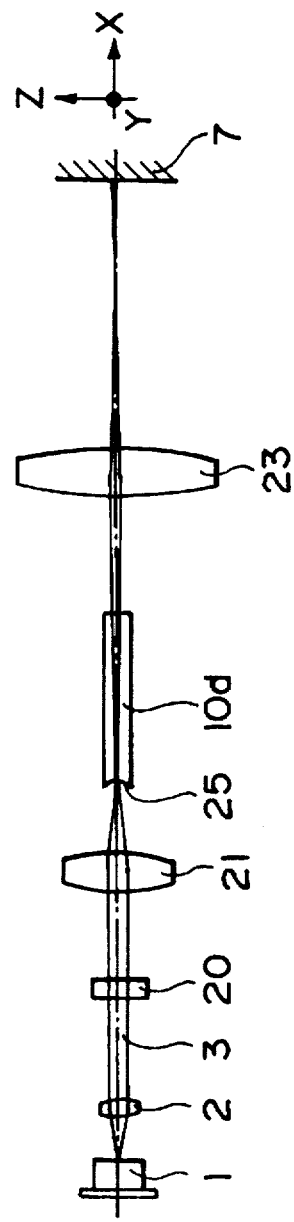
FIG. 8B is a schematic partial side view illustrating the essential portion for the fifth embodiment of the present invention.

FIGS. 8A and 8B are schematic diagrams illustrating the essential portion for a fifth embodiment of the present invention. FIG. 8A is a plan view and FIG. 8B is a side view. The structure in this embodiment is substantially the same as that in the second embodiment, except that instead of first cylindrical lens 22, the beam incidence faces of the electrooptical devices 10c and 10d are made concave cylindrical faces 25. Also, the XYZ axial directions are set in the same manner as in the second embodiment. The generatrix of each of the concave cylindrical faces 25 is located on the X-Y plane and is parallel to the Y axis.

The first positive lens 21, the electrooptical devices 10c and 10d, the second positive lens 23 or the like each constitute one element of optical means.

The function of the fifth embodiment will now be explained. The two beams 5a and 5b pass through the first positive lens 21 to become convergent beams 5c and 5d, which then enter the electrooptical devices 10c and 10d. The two beams are changed by the respective concave cylindrical faces 25 into beams 5e and 5f, which are substantially collimated light in the X-Z plane while remaining convergent in the X-Y plane. The beams 5e and 5f pass through the electrooptical devices 10c and 10d.

The function thereafter is the same as that in the second embodiment.

The first positive lens 21 constitutes one element of beam reduction means component, and the electrooptical devices 10c and 10d are optical members having a different refractivity in the Y axial direction and in the Z axial direction.

With this embodiment, the same effect can be obtained as with the second embodiment, and since a number of optical devices is reduced as compared with the second embodiment, manufacturing costs and a loss of light quantity due to the reflection plane can be reduced.

Figure 9A:
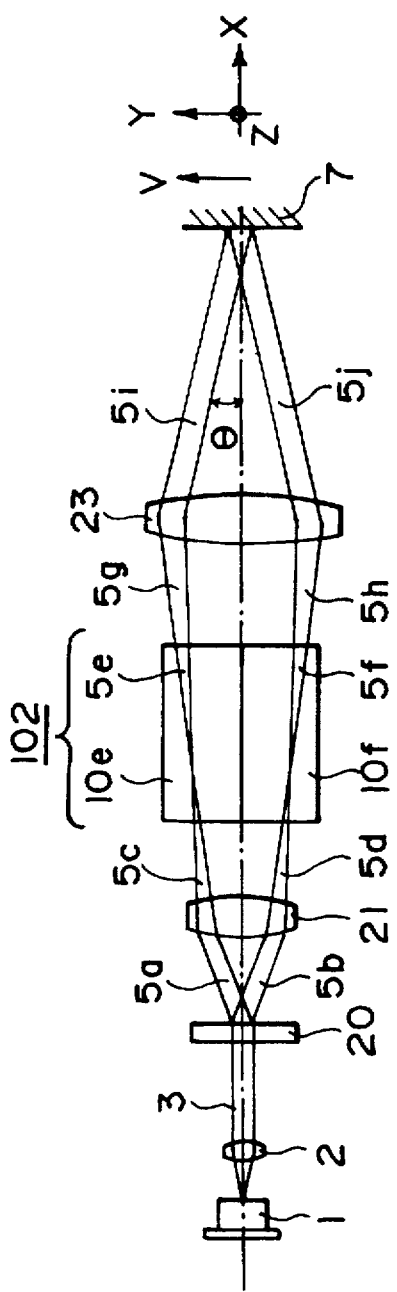
FIG. 9A is a schematic plan view illustrating the essential portion for a sixth embodiment of the present invention.
Figure 9B:
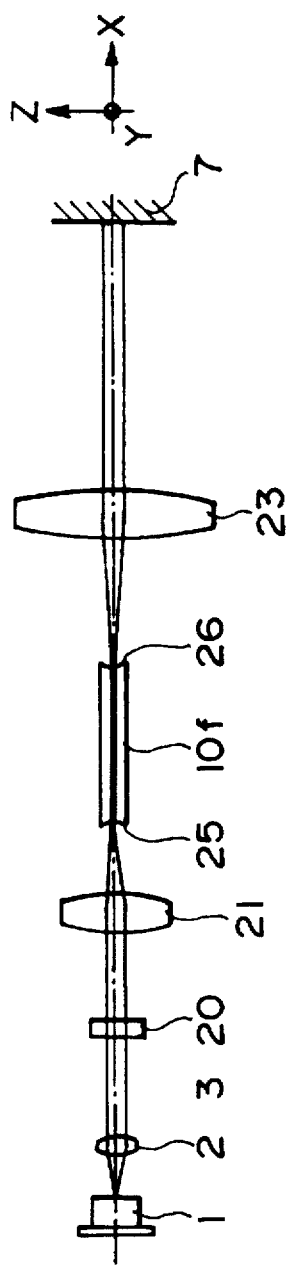
FIG. 9B is a schematic partial side view illustrating the essential portion for the sixth embodiment of the present invention.

FIGS. 9A and 9B are schematic diagrams illustrating the essential portion for a sixth embodiment of the present invention. FIG. 9A is a plan view and FIG. 9B is a side view. The structure in this embodiment is substantially the same as that in the third embodiment, except that instead of there being no first cylindrical lens 22 and second cylindrical lens 24, the beam incidence faces and the beam exit faces of the electrooptical devices 10a and 10b are made concave cylindrical faces 25 and 26. Also, the XYZ axial directions are set in the same manner as in the third embodiment. The generatrix of each of the concave cylindrical faces 25 and 26 is located on the X-Y plane and is parallel to the Y axis.

In this embodiment, the first positive lens 21, the electrooptical devices 10e and 10f, the second positive lens 23 or the like each constitute one element of optical means.

The function of the sixth embodiment will now be explained. The two split beams 5a and 5b pass through the first convergent lens 21 to become beams 5c and 5d, which thereafter enter the electrooptical devices 10c and 10d. At this time, the two beams are then changed by the respective concave cylindrical faces 25 to beams 5e and 5f, which are substantially collimated light in the X-Z plane while remaining convergent in the X-Y plane. The beams 5e and 5f pass through the electrooptical devices 10c and 10d. When the beams 5e and 5f emit from the concave cylindrical faces 26, they are changed to beams 5g and 5h that are divergent in the X-Z plane. The beams 5g and 5h are refracted by the second positive lens 23 and become beams 5i and 5j, which are collimated in the X-Y plane and have a predetermined spread in the X-Z plane. The moving object 7 is thus irradiated by the two beams 5i and 5j at an incident angle θ.

The positive lens 21 constitutes one element of beam reduction means, and the electrooptical devices 10e and 10f are optical members having a different refractivity in the Y axial direction and in the Z axial direction.

With this embodiment, the same effect can be obtained as with the third embodiment, and since a number of optical devices is reduced as compared with the third embodiment, manufacturing costs and a loss of a light quantity due to the reflection plane can be reduced.

With the arrangement described above for each of the embodiments, a displacement information detecting apparatus obtains velocity information more sensitively and accurately than can a conventional one, even with a thinner electrooptical device and a simpler drive circuit for the electrooptical device.

What is claimed is:

1. An optical device comprising:
   an electrooptical device for shifting a frequency of an incident beam by applying a voltage thereto; and
   an optical system for converging the beam at least in a plane including an application direction of the voltage and traveling direction of the beam, and for decreasing a degree of change of the diameter of the converged beam at least in the plane so as to reduce the diameter of the beam incident on the electrooptical device at least in the application direction.

2. An optical device according to claim 1, wherein said optical system collimates the beam in a plane including the application direction of the voltage and a traveling direction of the beam at one of a position on and a position in front of said electrooptical device.

3. An optical device according to claim 2, wherein said optical system includes a cylindrical lens and a spherical lens.

4. An optical device according to claim 2, wherein said optical system also collimates said beam in a plane including a direction perpendicular to said application direction of the voltage and said traveling direction of the beam.

5. An optical device according to claim 1, wherein said optical system includes a cylindrical face formed on a beam incident face of said electrooptical device.

6. An optical device according to claim 5, further comprising a cylindrical face formed on a beam exit face of said electrooptical device.

7. An apparatus for detecting displacement information of an object, comprising:
   a light source;
   an electrooptical device for shifting a frequency of a beam emitted from said light source, by applying a voltage thereto;
   a light receiving device for receiving scattered light from the object that is irradiated by the beam emerging from said electrooptical device to detect the displacement information of the object from a light reception signal by said light receiving device receiving the scattered light; and
   an optical system for converging the beam at least in a plane including an application direction of the voltage and a traveling direction of the beam, and for decreasing a degree of change of the diameter of the converged beam at least in the plane so as to reduce the diameter of the beam incident on the electrooptical device at least in the application direction.

8. An apparatus according to claim 7, wherein said optical system collimates the beam in a plane including said application of the voltage and a traveling direction of the beam at one of a position on and a position in front of said electrooptical device.

9. An apparatus according to claim 8, wherein said optical system includes a cylindrical lens and a spherical lens.

10. An apparatus according to claim 8, wherein said optical system also collimates said beam in a plane including a direction perpendicular to said application direction of the voltage and said traveling direction of the beam.

11. An apparatus according to claim 7, wherein said optical system includes a cylindrical face formed on a beam incident face of said electrooptical device.

12. An apparatus according to claim 11, further comprising a cylindrical face formed on a luminous exit face of said electrooptical device.

13. An apparatus according to claim 7, further comprising an optical device for causing the beam emerging from said electrooptical device to be a convergent beam in a plane including the application direction of the voltage and the traveling direction of the beam, and to be a collimated beam in a plane including a direction perpendicular to the application direction of the voltage and the traveling direction of the beam advances, and for irradiating the object.

14. An apparatus according to claim 7, further comprising an optical device for causing the beam emerging from said electrooptical device to be a collimated beam both in a plane including the application direction of the voltage and the traveling direction of the beam, and in a plane including a direction perpendicular to the application direction of the voltage and the traveling direction of the beam, and for irradiating the object.

15. An apparatus for detecting displacement information of an object, comprising:
   a light source;
   a beam splitting member for splitting a beam from said light source;
   a pair of electrooptical devices on which two corresponding split beams from said beam splitting member are incident respectively, and for shifting a frequency between the two split beams, by applying a voltage to at least one of said electrooptical devices;

a light receiving device for receiving scattered light from the object at a position where two beams from said electrooptical devices intersect each other to detect the displacement information of the object from a light reception signal by said light receiving device receiving the scattered light; and an optical system for converging each of the two split beams at least in a plane including an application direction of the voltage and a traveling direction of the beams, and for decreasing a degree of change of the diameter of each of the converged beams at least in the plane so as to reduce the diameters of the beams incident on the electrooptical devices at least in the application direction.

16. An apparatus according to claim 15, wherein a direction in which the displacement information of said object is to be measured, is substantially included in a plane including said traveling direction of said two split beams.

17. An apparatus according to claim 15, wherein said optical system collimates the two split beams in a plane including the application direction of the voltage and the traveling direction of the two split beams at one of a position on and a position in front of said electrooptical device.

18. An optical device comprising:

an electrooptical device for shifting a frequency of an incident beam by applying a voltage thereto; and an optical system for giving to the beam incident on said electrooptical device a condensing state which differs in an application direction of the voltage and in a direction perpendicular to the application direction.

19. An optical device according to claim 18, wherein said optical system collimates said beam in a plane including said application direction of the voltage and a traveling direction of the beam, and wherein said optical system condenses said beam in a plane including a direction perpendicular to said application direction of the voltage and said traveling direction of the beam.

20. An optical apparatus comprising:

an electrooptical element, said electrooptical element shifting frequency of a light beam incident thereon by application of voltage; and an optical system, said optical system changing the light beam incident on said electrooptical element to a substantially parallel light beam whose diameter is reduced in only the direction of the application of voltage.

21. An apparatus for detecting an information of displacement of an object comprising:

a light source;

an electrooptical element, said electrooptical element shifting frequency of a light beam incident thereon by application of voltage;

a light receiving element, said light receiving element receiving light from said object illuminated with an outgoing light from said electrooptical element, wherein said light receiving element detects said information of displacement of said object from a light receiving signal from said light receiving element which optically receives a scattered light from said object; and an optical system, said optical system changing the light beam incident on said electrooptical element to a substantially parallel light beam whose diameter is reduced in only the direction of the application of voltage.

* * * * *

UNITED STATES PATENT AND TRADEMARK OFFICE
CERTIFICATE OF CORRECTION

PATENT NO. : 5,754,282
DATED : May 19, 1998
INVENTOR(S) : Kato et al.

It is certified that error appears in the above-identified patent and that said Letters Patent is hereby corrected as shown below:

<u>COLUMN 5</u>:

Line 39, "rays" should read --rays,--.

<u>COLUMN 7</u>:

Line 32, "$\tau(V)$" should read --T(V)--.

Signed and Sealed this

Fifteenth Day of June, 1999

Attest:

Q. TODD DICKINSON

Attesting Officer

Acting Commissioner of Patents and Trademarks